April 26, 1960 R. E. MEYERS 2,934,089
REACTION LIMITING CONTROL VALVE
Filed July 18, 1956
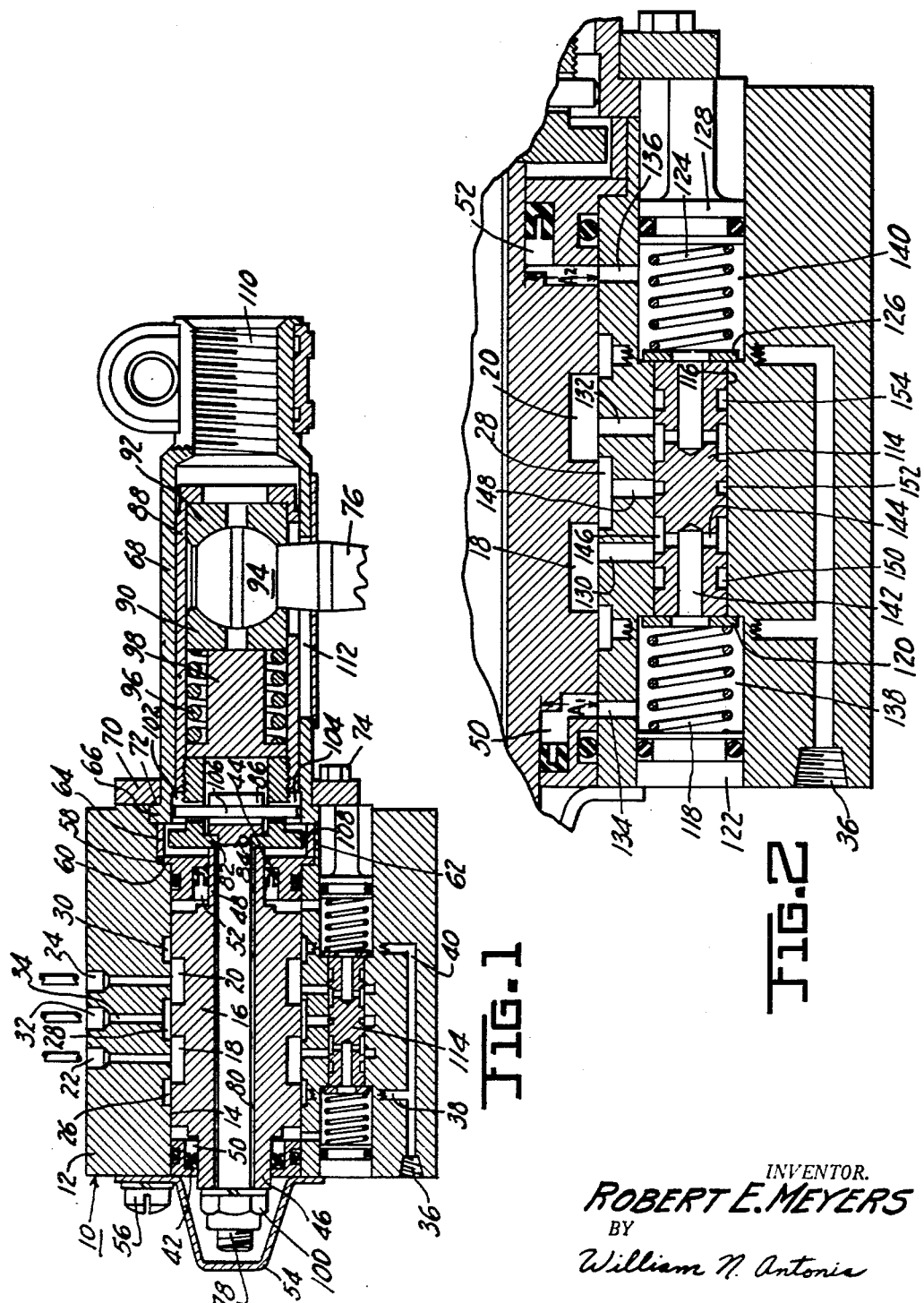
INVENTOR.
ROBERT E. MEYERS
BY
William N. Antonia
ATTORNEY United States Patent Office 2,934,089
Patented Apr. 26, 1960

2,934,089
REACTION LIMITING CONTROL VALVE

Robert E. Meyers, South Bend, Ind., assignor to Bendix Aviation Corporation, South Bend, Ind., a corporation of Delaware Application July 18, 1956, Serial No. 598,647

9 Claims. (Cl. 137—622)

The present invention relates to fluid power steering, and more particularly to improvements in a control valve, of the type disclosed in S. I. MacDuff's application Serial No. 457,836.

An object of this invention is to provide a control valve in a power steering system for a vehicle which limits driver "feel" within a predetermined range. Another object of this invention is to more accurately control the ratio of power applied to manual effort.

A further object of this invention is to provide a control valve having a reaction limiting device which is more economical to fabricate.

An important object of this invention is to provide a reaction limiting device, for a control valve having differential reaction areas, which limits the pressure acting against one area to one value and limits the pressure acting against the other area to another value.

Another object of this invention is to provide a reaction limiting device for a power steering control valve having a single plunger arrangement which may be used with different preloaded springs in order to provide proper feel.

A further object of this invention is to provide a reaction limiting device for a power steering control valve having a single plunger which may be used with any combination of preloaded springs irrespective of their diameters.

A still further object of this invention is to provide a control valve having a single plunger reaction limiting device with relief grooves on the plunger for maintaining the plunger in a concentric position.

The above and other objects and features of the invention will become apparent from the following description of the apparatus taken in connection with the accompanying drawings which form a part of this specification and in which:

Figure 1 is a vertical section of an open center power steering valve incorporating my invention; and Figure 2 is an enlarged fragmentary section of the open center valve of Figure 1.

Referring to Figure 1 of the drawings, numeral 10 designates a control valve comprising a housing member 12 having a bore 14 therein. A valve member 16 lies within the bore 14 and is movable in opposite directions from a normally neutral or center position, thereby controlling flow in the hydraulic system. The valve member 16 is formed with two annular channels 18 and 20 which communicate with cylinder ports 22 and 24 respectively. The bore 14 of the housing is provided with annular channels 26, 28, and 30. Annular channel 28 is in communication with a return port 32 by way of passage 34. Annular channels 26 and 30 communicate with an inlet port 36 through passages 38 and 40. The control valve shown in Figure 1 is an open center type valve which in neutral position allows free flow of the hydraulic fluid between the inlet port 36 and the return port 32 via the annular channels which are arranged in overlapping relationship.

Sealing bushings 42 and 44 are located at reduced ends 46 and 48 of the valve members 16 to provide reaction chambers 50 and 52. These reaction chambers are in effect hydraulic pressure reaction means built into the control valve in order to oppose movement of the valve member 16 away from its neutral position. In other words, the hydraulic pressure communicated to these chambers acts on the member tending to oppose relative movement from neutral and when such movement occurs to restore it to a neutral position.

The bushing 42 is retained in the bore 14 by an endcap 54 which engages the outer side of the bushing. Bolts 56, only one of which is shown, secure the endcap to the housing member 12. The bushing 44 includes a flange 58 which engages a shoulder 60 formed in a counterbore 62 located at the end of bore 14. A spacer ring 64 is arranged in the counterbore between a flange 58 and inner end 66 of the sleeve 68. A ring 70 slides over the sleeve 68 for engagement with a shoulder 72 formed at the inner end 66 of the sleeve for securing the sleeve 68, spacer ring 64, and bushing 44 in assembled relationship. Bolts 74, only one of which is shown, hold the ring 70 against the end of the housing member.

The valve member 16 is operatively connected to a ball stud 76 for sliding movement in the bore. The connection to the stud is an assembly of parts comprising a bolt 78, extending through a central passage 80 of the valve member, a stop bushing 82 having an opening 84 therein which passes the small diameter of the bolt but not the enlarged end 86, an inner sleeve 88 the inner end of which threadedly engages the stop bushing 82, members 90 and 92 providing sockets for a spherical end 94 of the stud, a spring 96, and a ball socket member 98. With nut 100 tightened down against the end 46 of the valve member, movement of the ball stud will cause the valve member and assembly to move as a unit in the housing member 12 and sleeve 68. The inner end of the sleeve 68 is slotted at 102 and 104 to receive the ends of pin 106 thereby preventing rotation of the assembly in the bore. The pin 106 passes through the stop bushing 82 and enlarged end 86 of the bolt 78 in order to prevent the latter from turning when the nut 100 is applied thereto.

Note that the stop bushing 82 has a radially extending flange 108 which engages the inner end 66 of the sleeve 68 when the valve member is moved to the right as viewed in Figure 1, and the outer side of sealing bushing 44 when the valve member is moved to the left. This positive engagement between the stop bushing 82 and the sleeve 68 after a predetermined movement of the valve member permits manual steering in the event of power failure. The end of sleeve 68 is threaded at 110 so that it may be connected to the end of a cross tie rod (not shown). The side wall of the sleeve 68 is provided with an axially extending opening 112 to permit movement of the ball stud as explained above.

The invention claimed herein concerns the utilization of reaction limiting means with a hydraulic reaction type control valve. Looking at Figures 1 and 2 it will be seen that the limiting means includes a single regulating valve 114 which controls the pressure in both reaction chamber 50 and reaction chamber 52. The regulating valve is slidable within a bore 116 of the housing member. Movement of the regulating valve 114 is limited in one direction by a preloaded spring 118 which is confined between retaining ring 120 and plug 122 and in the other direction by a preloaded spring 124 which is confined between retaining ring 126 and plug 128. The springs are designed to be overcome when the pressures acting on the areas of the regulating valve reach predetermined values. Passages 130 and 132 connect annular channels 18 and 20 with the bore 116, while passages 134 and 136 connect the reaction chambers 50 and 52 with counterbores 138 and 140.

The left half of the regulating valve 114 includes an axial passage 142 which connects radial passage 144 with counterbore 138. The radial passage 144 terminates at its outer end in an annular groove 146 formed in the exterior surface of the element. The axial width of the groove 146 is less than the axial distance between adjacent edges of passage 130 and passage 148 which communicates with the return port 32 via annular channel 28. With the valve element 114 shifted to the right against the spring 124, so that the edges of the groove 146 lie between the adjacent edges of the passages 130 and 148 communication between annular channel 18 and reaction chamber 50 is cut off. Any further shifting to the right of the regulating valve will cause groove 146 to overlap the edge of passage 148 thereby establishing communication between return port 32 and reaction chamber 50 via counterbore 138, axial passage 142 and radial passage 144. It will therefore be seen that the regulating valve is capable of shuttling within its bore so that the pressure in the reaction chamber will not rise above a predetermined value. In this manner any pressure build up in the reaction chamber, due to leakage, over and above the reaction cut out point would be taken care of by the shifting plunger.

The right half of the regulating valve has similar axial and radial passages for controlling the hydraulic pressure in reaction chamber 52 and movement of the valve to the left against spring 118 will cut off communication between annular channel 20 and reaction chamber 52 in the manner described above. Annular relief grooves 150, 152 and 154 maintain the regulating valve concentric with the bore 116 with the aid of hydraulic pressure due to leakage and return port back pressure.

When using reaction limiting means with power steering valves having differential reaction areas, as shown and described in S. I. MacDuff's application Ser. No. 264,814, now Patent Number 2,757,748, issued August 7, 1956, it is necessary in order to achieve proper "feel" to cut off the hydraulic pressure within one of the reaction chambers at one predetermined value and in the other reaction chamber at another predetermined value. If the pressures in both of the reaction chambers were limited to the same predetermined value, then the reaction force, when turning in one direction, would be greater than the reaction force when turning in the other direction, since equal maximum pressures would be acting against reaction walls having different cross sectional areas. My invention obviates such difficulties by providing a single regulating valve 114 and two preloaded springs 118 and 124. By using springs having different preloads it is possible to maintain equal maximum reaction forces for either direction of turning, since it is then possible to cut off communication to the respective reaction chambers at different predetermined values.

My invention has the further advantage of permitting a single standard size regulating plunger to be used in loaded springs. Note that the size of the springs is limited various control valves requiring stronger or weaker preonly by the diameters of the counterbores and not by the diameter of the bore containing the regulating valve.

Operation of the control valve is as follows:

With the parts of the control valve 10 in the position shown in Figures 1 and 2 the valve is in hydraulic balance and is in a neutral position. Fluid under pressure enters inlet port 36, divides into annular channels 26 and 30, and passes to annular channel 28, which is connected to the return port 32, by way of annular channels 18 and 20. At this time the regulating valve element 114 connects the pressures existing in annular channels 18 and 20 to the reaction chambers 50 and 52 respectively.

Shifting the valve member 16 to the left tends to restrict communication between annular channels 30 and 20 and increase communication between annular channels 26 and 18. Since annular channel 20 is connected to reaction chamber 52 via the passage 132, the passages in the right portion of regulating valve element 114, counterbore 140 and passage 136, the pressure in reaction chamber 52 will be reduced. Also since annular channel 18 is connected to the reaction chamber 50 via the passage 130, the passages in the left portion of regulating valve element 114, counterbore 138 and passage 134, the pressure in reaction chamber 50 will increase. This pressure in chamber 50 acts on the end of the valve member opposing further movement of the valve member with a force equal to the effective area of the movable wall multiplied by the unit pressure in the chamber. This force is in the form of a reaction force which is transmitted to the operator of the vehicle, through ball stud 76.

If the resistance offered to steering becomes sufficiently great to cause the pressure required for power assistance to exceed a predetermined value, said predetermined value being controlled by the preload on spring 124, regulating valve element 114 will move to the right compressing spring 124, thereby cutting off communication between annular channel 18 and reaction chamber 50. From this time on, the reaction or "feel" transmitted to the operator will remain the same regardless of an increase in pressure in the annular channel 18. Since reaction area $A_1$ is less than reaction area $A_2$, spring 124 will have a higher preload than spring 118.

If the valve member is shifted to the right, regulating valve 114 will also control the pressure in reaction chamber 52 in a similar manner to that just described, except that the described process will be in reverse.

The several practical advantages which flow from my reaction limiting means are believed to be obvious from the above, and other advantages may suggest themselves to those who are familiar with the art to which this invention relates.

Having thus described the various features of the invention, what I claim as new and desire to secure by Letters Patent is:

1. In a control valve having a housing member and a valve member located therein, said valve member being movable with respect to said housing member from a neutral position for controlling flow, means including two reaction areas subject to variable pressures and associated with said members for opposing movement therefrom neutral, reaction limiting means limiting the pressures acting on said reaction areas to predetermined values, said reaction limiting means comprising a valve element, a first spring opposing movement of the valve element in one direction and a second spring opposing movement of the valve element in the other direction, said valve element being movable in one direction to limit the pressure acting against one of said reaction areas to a first predetermined value and also being movable in the other direction to limit the pressure acting against the other of said reaction areas to a second predetermined value.

2. In a control valve provided with an inlet, outlet, and two cylinder ports, and a valve member for controlling flow between all of said ports, first and second chamber means subject to a variable pressure, passage means communicating each of said chamber means with the inlet and outlet ports, means in each of said chamber means including a reaction area associated with said member and acted upon by said variable pressure for opposing movement of said member from neutral, reaction limiting means located in said passage means and being responsive to pressure in said chamber means for controlling flow in said passage means, said reaction limiting means comprising a valve element, and first and second springs opposing movement of the valve element, said valve element being movable in one direction against said first spring to cut off communication between said inlet port and one of said chamber means and also being movable in another direction against said second spring to cut off communication between said inlet port and the other of said chamber means.

3. A control valve comprising a housing member having a bore therein, a valve member movable in opposite directions from a normally neutral position within said bore, annular channels formed in said bore and on said valve member, an inlet port, an outlet port, two cylinder ports, said annular channels being arranged in overlapping relationship and in communication with said ports, two reaction chambers, one located at each end of said valve member, said chambers communicating respectively with the cylinder ports, reaction limiting means interposed between said reaction chambers and said cylinder ports, said reaction limiting means comprising a valve element responsive to predetermined cylinder pressures, a first spring opposing movement of the valve element in one direction and a second spring opposing movement of the valve element in the other direction, said valve element being movable in one direction to cut off communication between one of the cylinder ports and one of the chambers at a first predetermined pressure and also being movable in the other direction to cut off communication between the other cylinder port and the other chamber at a second predetermined pressure.

4. A control valve comprising a housing member having a bore therein, a valve member movable in opposite directions from a normally neutral position within said bore, annular channels formed in said bore and on said valve member, an inlet port, an outlet port, two cylinder ports, said annular channels being arranged in overlapping relationship and in communication with said ports, two chambers, one chamber located at each end of the valve member, said chambers being formed with a portion of the valve member which acts as a movable wall of each chamber, a valve element located between said reaction chambers and said cylinder ports, said valve element having a first passage for communicating one of said chambers with one of said cylinder ports and a second passage for communicating the other of said chambers with the other of said cylinder ports, a first spring opposing movement of the valve element in one direction and a second spring opposing movement of the valve element in the other direction, said valve element being movable in one direction to cut off communication between one of the cylinder ports and one of the chambers at a first predetermined pressure and also being movable in the other direction to cut off communication between the other cylinder port and the other chamber at a second predetermined pressure.

5. A control valve comprising a housing member having a bore therein, a valve member movable in opposite directions from a normally neutral position within said bore, annular channels formed in said bore and on said valve member, an inlet port, an outlet port, two cylinder ports, said annular channels being arranged in overlapping ports, said annular channels being arranged in overlapping relationship and in communication with said ports, two reaction chambers, one chamber located at each end of the valve member, said chambers being formed with a portion of the valve member which acts as a movable wall of each chamber, a second bore in said housing, passages connecting said second bore with said reaction chambers and said cylinder ports, a valve element slidable in said second bore for controlling flow between said cylinder ports and said reaction chambers, a first spring opposing movement of said element in one direction and a second spring opposing movement of said valve element in the other direction.

6. A control valve comprising a housing member having a bore therein, a valve member movable in opposite directions from a normally neutral position within said bore, annular channels formed in said bore and on said valve member, an inlet port, an outlet port, two cylinder ports, said annular channels being arranged in overlapping relationship and in communication with said ports, two reaction chambers, one chamber located at each end of the valve member, said chambers being formed with a portion of the valve member which acts as a movable wall of each chamber, a second bore in said housing, passages connecting said second bore with said reaction chambers and said cylinder ports, a valve element slidable in said second bore for controlling flow between said cylinder ports and said reaction chambers, a first spring opposing movement of said valve element in one direction and a second spring opposing movement of said valve element in the other direction, and annular relief grooves formed on said valve element for maintaining said valve in a concentric position with respect to said bore.

7. A control valve comprising a housing member having a bore therein, a valve member movable in opposite directions from a normally neutral position within said bore for controlling flow, an inlet port, an outlet port and two cylinder ports, two reaction chambers formed within said valve housing, a valve element establishing communication between said cylinder ports and said chambers, said valve element being constructed and arranged to respond to predetermined cylinder pressures to cut off communication between said cylinder ports and said chambers, a first preloaded spring opposing movement of the valve element in one direction and a second preloaded spring opposing movement of the valve element in the other direction, said valve element being movable in one direction to cut off communication between one of the cylinder ports and one of the chambers at a first predetermined pressure and also being movable in the other direction to cut off communication between the other cylinder port and the other chamber at a second predetermined pressure.

8. A control valve comprising a housing member having a bore therein, an inlet port, an outlet port, and two cylinder ports, a valve member movable in opposite directions from a normally neutral position within said bore for controlling flow between said ports, first and second reaction chambers, a second bore formed in one of said members, passages connecting said second bore with said reaction chambers and said cylinder ports, a valve element slidable in said second bore for controlling flow between said cylinder ports and said reaction chambers, a first spring opposing movement of said element in one direction and a second spring opposing movement of said valve element in the other direction, said valve element being movable in one direction to cut off communication between one of the cylinder ports and one of the chambers at a first predetermined pressure and also being movable in the other direction to cut off communication between the other cylinder port and the other chamber at a second predetermined pressure.

9. A control valve comprising a housing member having an inlet, outlet, and two cylinder ports, a valve member located in said housing member and movable with respect thereto for controlling flow between said ports, reaction chamber means formed within said housing member, said chamber means including unequal reaction areas subject to variable inlet pressure, a valve element establishing communication between said inlet port and said chamber means, said valve element being constructed and arranged to respond to predetermined inlet pressures to cut off communication between said inlet port and said chamber means, a first preloaded spring opposing movement of the valve element in one direction and a second preloaded spring opposing movement of the valve element in the other direction, said valve element being movable in one direction to cut off communication between the inlet port and said chamber means at a first predetermined pressure and also being movable in the other direction to cut off communication between the inlet port and the chamber means at a second predetermined pressure, said inlet pressure effectively acting on one of said unequal reaction areas up to said first predetermined pressure and on the other of said unequal reaction areas up to said second predetermined pressure.

References Cited in the file of this patent

UNITED STATES PATENTS

| | | |
|---|---|---|
| 2,596,242 | Hill | May 13, 1952 |
| 2,786,454 | Bertsch | Mar. 26, 1957 |
| 2,808,120 | Hunter | Oct. 1, 1957 |
| 2,824,314 | Davis | Feb. 25, 1958 |

UNITED STATES PATENT OFFICE

CERTIFICATION OF CORRECTION

Patent No. 2,934,089 April 26, 1960

Robert E. Meyers

It is hereby certified that error appears in the above numbered patent requiring correction and that the said Letters Patent should read as corrected below.

Column 3, line 52, strike out "various control valves requiring stronger or weaker pre-" and insert the same after "in" in line 50, same column.

Signed and sealed this 9th day of May 1961.

(SEAL)
Attest:

ERNEST W. SWIDER
Attesting Officer

DAVID L. LADD
Commissioner of Patents